United States Patent
Lichtenwald et al.

(10) Patent No.: US 12,540,646 B2
(45) Date of Patent: Feb. 3, 2026

(54) CLUTCH WITH A PISTON THAT CAN BE PRESSURISED ON BOTH SIDES AND A SNAP CLOSURE HAVING A CANTILEVER-TYPE ARM

(71) Applicant: Schaeffler Technologies AG & Co. KG, Herzogenaurach (DE)

(72) Inventors: Viktor Lichtenwald, Fürth (DE); Knut Erdmann, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/719,446

(22) PCT Filed: Nov. 16, 2022

(86) PCT No.: PCT/DE2022/100857
§ 371 (c)(1),
(2) Date: Jun. 13, 2024

(87) PCT Pub. No.: WO2023/110004
PCT Pub. Date: Jun. 22, 2023

(65) Prior Publication Data
US 2025/0137498 A1    May 1, 2025

(30) Foreign Application Priority Data
Dec. 13, 2021   (DE) ................. 10 2021 132 824.1

(51) Int. Cl.
*F16D 25/08* (2006.01)
*F16D 11/10* (2006.01)
*F16D 11/00* (2006.01)

(52) U.S. Cl.
CPC ............ *F16D 25/083* (2013.01); *F16D 11/10* (2013.01); *F16D 2011/002* (2013.01)

(58) Field of Classification Search
CPC ... F16D 25/083; F16D 11/10; F16D 2011/002
See application file for complete search history.

(56) References Cited

U.S. PATENT DOCUMENTS

| 2003/0029692 A1* | 2/2003 | Rogner | F16D 25/087 192/112 |
| 2015/0233429 A1* | 8/2015 | Bosnjak | F16D 25/087 192/85.59 |

(Continued)

FOREIGN PATENT DOCUMENTS

| DE | 1275879 B | 8/1968 |
| DE | 102006033984 A1 | 1/2008 |

(Continued)

*Primary Examiner* — Lori Wu

(57) ABSTRACT

A clutch for selectively coupling a motor to a motor vehicle drivetrain includes a sliding sleeve, an actuating cap arranged for moving the sliding sleeve, a housing comprising two pressure chambers, and a piston arranged in a pressure-dependent axially movable manner between the two pressure chambers. The actuating cap has a cantilever-like arm with a snap closure at a free end, and the snap closure is arranged to engage on the sliding sleeve. In an example embodiment, the actuating cap has a main body and a slit extending between the cantilever-like arm and the main body, the cantilever-like arm projects from the main body, and the slit is arranged to adjust a stiffness of the cantilever-like arm in an axial direction and a radial direction.

16 Claims, 6 Drawing Sheets

(56) References Cited

U.S. PATENT DOCUMENTS

2017/0284538 A1\* 10/2017 Matsui .................... F16H 59/40
2017/0363178 A1   12/2017 Rekow et al.

FOREIGN PATENT DOCUMENTS

| DE | 102014213884 A1 |   | 2/2015 |
| DE | 102017207136 A1 |   | 12/2017 |
| DE | 102021101141 A1 |   | 7/2022 |
| JP | H04203626 A |   | 7/1994 |
| JP | 2021036173 A | \* | 6/2021 |

\* cited by examiner

CLUTCH WITH A PISTON THAT CAN BE PRESSURISED ON BOTH SIDES AND A SNAP CLOSURE HAVING A CANTILEVER-TYPE ARM

CROSS-REFERENCE TO RELATED APPLICATIONS

This application is the United States National Phase of PCT Appln. No. PCT/DE2022/100857 filed Nov. 16, 2022, which claims priority to German Application No. DE102021132824.1 filed Dec. 13, 2021, the entire disclosures of which are incorporated by reference herein.

TECHNICAL FIELD

The present disclosure relates to a clutch for coupling and decoupling a motor from a motor vehicle drive train. The clutch includes a piston which is arranged in a housing having, for example, pressure connections between two pressure chambers each connected to one of the pressure connections so as to be axially displaceable due to pressure. The piston is connected to, for example, a separate or integral actuating cap in a materially bonded, form-fitting and/or force-fitting or one-piece manner, which is prepared for contacting/moving a sliding sleeve.

BACKGROUND

Decoupling devices for separating a motor from a drive train are already known from the prior art. For example, DE 10 2021 101 141 A1 discloses such a decoupling device, which can also be referred to as a clutch.

This older prior art relates to a decoupling device for separating a motor from a drive train has a piston which is movably mounted in a housing parallel to a longitudinal axis L of the housing and which has an arm for directly or indirectly actuating a coupling element. A first region of the piston is operatively connected to a first pressure space such that when pressure is applied to the first pressure space, the piston is moved in a first direction parallel to the longitudinal axis L, and a second pressure space is provided which is operatively connected to a second region of the piston such that when pressure is applied to the second pressure space, the piston is moved in a second direction parallel to the longitudinal axis L, said second direction being opposite the first direction. The disclosure also relates to such an object, which is to be considered as included here. In this earlier patent application, it has been particularly emphasized that the first region is located at a first longitudinal end of the piston and the second region is formed by a recess in a lateral surface of the piston and that the recess is formed on an outer half of the lateral surface of the piston, viewed radially with respect to the longitudinal axis L. Furthermore, it has been found to be expedient that each of the pressure spaces is equipped with a pressure connection. In addition, the piston should be formed as an annular piston which extends about the longitudinal axis L.

Furthermore, the earlier patent application-which is to be considered as included as disclosed here with regard to the functional and effective relationships as well as the geometry-contains a first ball bearing located radially inside the piston and on which the arm of the piston is mounted. Thus, a claw should be provided, on which the first ball bearing rests radially on the inside and which is designed to actuate the clutch element with a free end. A second ball bearing may be included, on which the housing is supported radially outward.

Similar devices are also known from DE 10 2014 213 884 A1 and JP H04 203 626 A.

SUMMARY

The present disclosure thus relates to a DCU/disconnect unit for electric axles, having a shifting crown with two functions. Concepts with multi-disc clutches are well known on the market. Until now, the discs were constantly pre-loaded using shifting pistons. In the multi-disc clutch, the soft end stop was the disc itself. Due to the current requirement, the torque clutch with a form fit is shifted instead of a multi-disc clutch. This causes shifting noises when engaging (tooth-on-tooth position), which are now avoided. Due to the hydraulic actuation, the tooth-on-tooth position of the shifting piston/shifting crown cannot easily be controlled with the appropriate speed and force. This is still the case, but the previously unacceptable NVH disturbances are avoided. These would otherwise occur between the sliding sleeve/shift sleeve and the clutch body. Known solutions concerned synchronization and a shift fork with corresponding stiffness. In addition, the shifting crown/shifting piston with the sliding sleeve also had to be assembled. This is now all avoided and the axial stiffness provided. Assembly is thus simplified.

The hard end stop in the tooth-on-tooth position between the clutch body and the sliding sleeve is reduced. A robust assembly is achieved with the help of the snap connection to the sliding sleeve. The solution uses the special design of the shifting crown, which simultaneously takes into account the assembly and the axial stiffness. The shifting crown has a special arm design for mounting and stiffness. With the lever for radial stiffness it is possible to realize the snap closure on the groove in the shifting crown/the shifting piston to the web on the sliding sleeve. The lever for the axial stiffness also makes it possible to easily adjust the axial stiffness. For the function, it is particularly advantageous to take the axial stiffness into account by choosing the appropriate material thickness and the respective length. The form and design must also be kept in focus.

The present disclosure also discloses a system that works for bilaterally actuated/interacting pistons. The new concept focuses on developing two variable pressure spaces using a baffle plate and a variable pressure connection using a pressure space sleeve for implementation within one housing. In order to return the claw clutches to the open state when they are closed, a baffle plate is arranged behind a second seal and the design of the pressure space is changed. In a first variant, a housing design is shown which contains a piston that can be actuated in two directions. The piston is inserted into the housing with two seals like a standard hydraulic clutch slave cylinder. The first pressure chamber and the pressure connection are located next to, for example, the right side of the annular piston and provide a pre-stroke. A second pressure chamber is then located, for example, to the left of a tapering of the annular piston. This second pressure chamber is made possible by inserting a baffle plate with a third seal into the housing and securing it with a circlip. It has a second pressure connection which moves the piston back to the left when pressure is applied, thus forming the return stroke. In some designs, however, the piston may be made in two parts for assembly.

In some example embodiments, the second pressure chamber is moved inwards, to the underside of the piston. In order to accommodate a pressure connection in a confined space on the inside of the housing, a pressure space sleeve is used. This is equipped with an annular groove and two O-rings on the sides and is fixed in the housing with a circlip. Two holes within the ring groove ensure the flow of the operating medium.

In general, it should be understood that the piston should be guided and centered via a sliding band. The baffle plate is sealed to the housing with an O-ring. The end stop when the claw is open is realized via additional webs on the baffle plate. In both variants, a sensor travel measurement is provided. An X-sealing ring can be used because it is pressurized from both sides (alternately) (pressure chamber 1 and 2).

The disclosed device is suitable for a front-wheel E-axle and a hydraulic actuation of the coupling/decoupling unit, e.g., when using a claw clutch.

The cantilever-like arm projecting from a main body of the actuating cap may be spaced apart by a slit/recess extending between the cantilever-like arm and the main body, by means of which the elasticity/stiffness in the axial direction and radial direction is selectively adjusted. The cantilever-like arm is therefore separated from the main body (mostly but not completely) via the slit. The extension allows the elasticity/stiffness to be selectively adjusted in both the axial and radial directions.

It has proven to be effective if the slit extends only partially through the material of the actuating cap in the circumferential direction, but completely through the material in the radial direction.

It is also beneficial if there is a slot in the cantilever-like arm. A precise adjustment of the stiffness/elasticity can then be made.

If the slot runs parallel to the slit and has the same axial width, for example, manufacturing is simplified.

The cantilever-like arm may define a lever. Presetting will then be easier.

If the snap closure with axial clearance surrounds a radial projection of the sliding sleeve, assembly becomes easier.

It is useful if the slot is designed as a rectangular through-opening.

In an example embodiment, the cantilever-like arm is designed to be L-shaped or Z-shaped.

A stop disc/baffle plate may be arranged in a pressure chamber, e.g., separate from the housing and the piston, which limits an axial movement of the piston at least in one axial direction. In this way, variable pressure spaces/pressure chambers and pressure connections for interacting pistons are implemented. The disclosure focuses on two variants for implementing variable pressure spaces for inter-acting pistons.

The stop disc may be arranged radially inside or radially outside the piston. In the radially inner arrangement, the piston can be formed as one piece with the actuating cap. A better use of installation space, e.g., smaller-scale use of installation space, may possibly be achieved with a radially outer arrangement. However, this could have disadvantages during installation.

If the piston is prepared for bilateral/alternating pressurization, actuation in one axial direction and the opposite axial direction is possible in a small installation space.

It has also proven to be effective if the stop disc has at least one axial projection which is designed to strike the axial piston and penetrate one of the pressure chambers. This then results in the targeted design and use of space.

If a large number of axial projections protrude from an end face of the stop disc, distributed over the circumference, jamming of the piston/annular piston within the housing can be effectively prevented. For example, an evenly distributed arrangement of the axial projections has advantages in this regard.

In an example embodiment, with a circlip fixed in the housing at least the axial position of the stop disc is fixed, for example together with a step of the housing.

The sliding sleeve may be connected to the actuating cap. This can also simplify assembly. This connection can be permanent or temporary.

Furthermore, an end stop disc designed to be elastic in the axial direction may be provided to limit the axial movement of the sliding sleeve/shift sleeve.

It is expedient if the end stop disc has an S-shape or double S-shape in the longitudinal section along the axis of rotation of the clutch.

The end stop disc may be mounted in a preloaded manner.

It is also expedient if the end stop disc is attached to a shaft, for example an intermediate shaft.

In an example embodiment, the end stop disc is mounted with preload force between a clutch body prepared for torque connection with the sliding sleeve and a shaft-fixed securing ring.

It has proven to be effective if the radial extension of the end stop disc is larger than that of the clutch body.

There may be an empty space between the end stop disc and the clutch body.

The securing ring may be arranged in a groove on the outer surface of the shaft in an axially defined position.

In an example embodiment, the end stop disc is designed to be at least ten times (at most 100 times) more elastic in the axial direction, i.e., the securing ring and/or the clutch body.

At least one mechanical locking element between an axially movable component and an axially fixed component may be designed and arranged in such a way that the sliding sleeve can be/is locked in two different axial positions, depending on the operating state.

The locking element may be arranged in the (axially) movable component, namely the shift sleeve or the piston on the one hand, and the axially fixed component, namely an idler gear or the housing on the other hand.

It is expedient if the locking element is arranged in a spring-loaded seat in the axially fixed (or axially movable) component in order to selectively engage between two grooves in the axially movable (or axially fixed) component in a locking manner.

It has proven to be effective if the grooves form a recess that is beveled on both sides.

It is useful if a locking/stopping is forced when the locking element engages in one of the two grooves.

In order to distribute the forces well, it has proven useful to use a large number of locking elements.

It is desirable if at least one of the locking elements/the locking element is shaped as a sphere or ball.

In an example embodiment, two detents, each with a locking element, are present at the same radial distance from an axis of rotation of the clutch.

It is useful if the grooves are in a hardened insert.

It is also desirable that the sliding sleeve is connected to the actuating cap.

Ultimately, a DCU/disconnect unit for electric axles with hydraulic actuation, having locking elements, is at the heart of this disclosure. The disclosed device now achieves an improvement. Due to the residual, unwanted pressures in the shifting piston (connection P1 or P2) from the hydraulic system, an unusual movement of the shifting piston occurs in the pressure chambers P1 and P2 due to the form-fitting connection of the shifting piston with the sliding sleeve, and additionally the movement of the sliding sleeve. Such unwanted movements are critical in terms of both function and functional safety (e.g., breakage of the toothing, uncontrolled driving of the vehicle). In the hydraulic system it can be implemented with additional effort or in the pressure valves it is complex by using complex, additional valves. This is no longer necessary.

At the same time, due to the complex hydraulic valves, the controllability and positioning of the shifting piston was also not robust. Here too, an improvement is achieved. The use of locking elements in/with moving parts leads to improvements in DCUs. A locking element between the shifting cylinder and the shifting piston as the one locking element, for example as a slotted wire ring, formed wire ring or as a pressure piece with a spiral spring, is effective. At the same time, it is also useful to use a locking element between the sliding sleeve and the idler gear. The object of both locking elements is to avoid the unusual axial movement of the shifting piston, which is achieved. The axial force is distributed between both locking elements and at the same time the end positions of the sliding sleeve and the shifting piston are ensured. To minimize friction, the axial clearances between the sliding sleeve and the shifting piston are guaranteed.

An improved disconnect unit with hydraulic actuation is now being introduced, especially for front axles and dual drive E-axles. Due to current findings and new concepts with a form fit (not a friction fit), solutions of this type are still unknown.

Thanks to the hydraulic actuation, the end stops of the shifting piston are now easier to control. This means that there is no longer unacceptable NVH disturbance between the sliding sleeve and a clutch body. The solution is to use an S-disc as an end stop between the locking ring and the clutch body. The S-disc can be designed to be elastic especially for the application and thus reduce the noise at the end stop. The S-disc can be mounted between the clutch body and the locking ring with appropriate preload. Especially for electric front axles and dual drive electric axles, an improved disconnect unit with hydraulic actuation is now possible.

Although concepts with multi-disc clutches are known on the market, they are now being improved: While the discs were previously constantly preloaded with shifting pistons and the end stops in multi-disc clutches were the discs themselves, an improved variant is now possible. Due to the current requirement, the dog clutch with a form fit is shifted instead of a multi-disc clutch. However, end stop shifting noises are avoided. Due to the hydraulic actuation, the end stop points of the shifting piston are still not easy to control, but unacceptable noises are avoided. Hard end stops between the clutch body and the sliding sleeve are avoided. Currently known end stops, which rely on a form fit, for example by using "humps" on the clutch body or rely on a form fit, for example by means of three end stops on the sliding sleeve itself, are now unnecessary.

For the disclosed solution, an S-disc is used as an end stop between the locking ring and the clutch body. The S-disc can be designed to be elastic, especially for the application, which reduces the noise at the end stop. The S-disc can be mounted between the clutch body and the securing rings with appropriate preload.

BRIEF DESCRIPTION OF THE DRAWINGS

The present disclosure is explained in more detail below with the aid of drawings. In the drawings.

DETAILED DESCRIPTION

The figures are only schematic in nature and serve only for the understanding of the disclosure. Identical elements are provided with the same reference symbols. Features of the individual embodiments can be interchanged.

Figure 1:
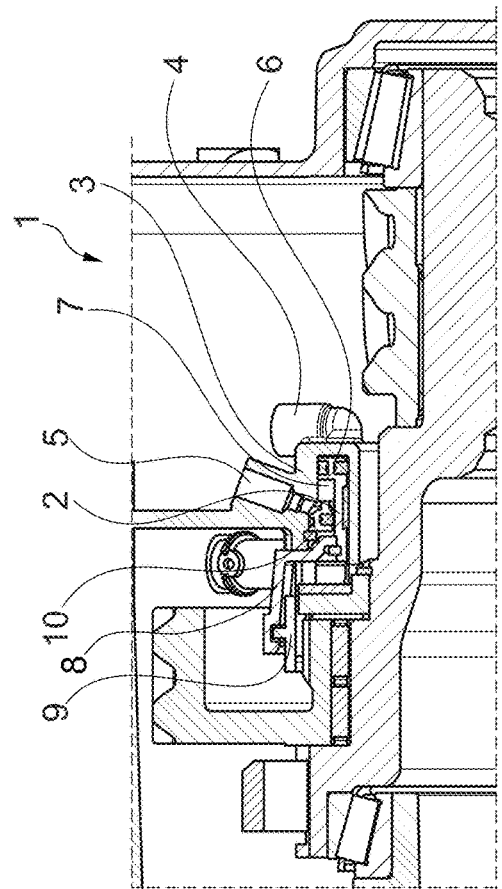
FIG. 1 shows a partially illustrated longitudinal section through a clutch according to the disclosure, wherein the two pressure spaces are located radially outside the piston.
Figure 3:
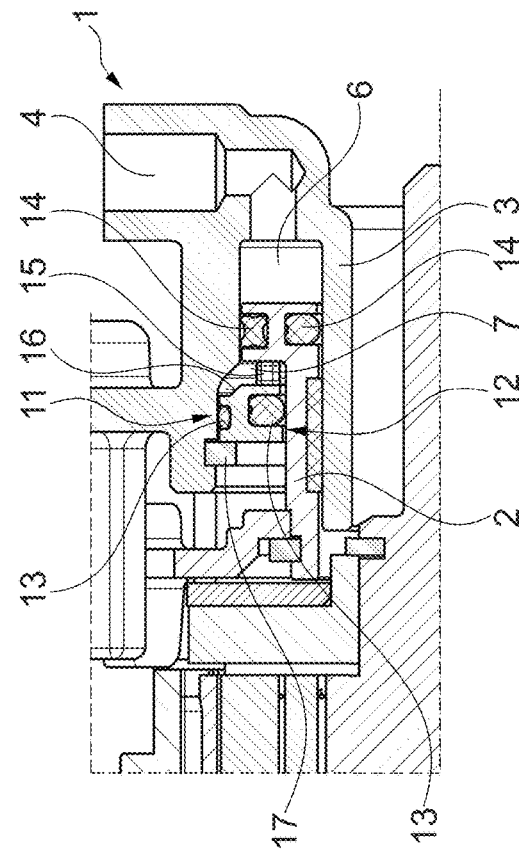
FIG. 3 shows the "claw open" operating position of the clutch of FIGS. 1 and 2.
Figure 2:
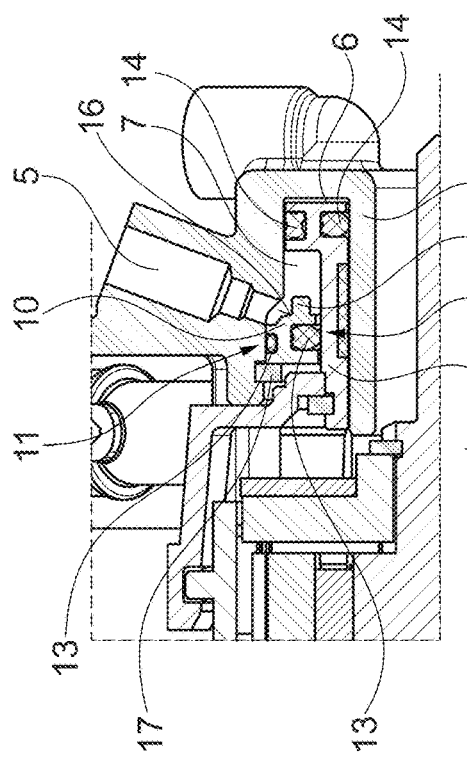
FIG. 2 shows the operating position of the clutch from FIG. 1 with "claw closed"

FIG. 1 shows a clutch 1. It has a piston 2. The piston 2 is designed for bilateral/alternating pressure application. It is arranged in a housing 3. Pressure connections 4 and 5 lead to a first pressure chamber 6 and a second pressure chamber 7 respectively. Reference is made here to FIGS. 2 and 3. The pressure connection 4 leads into the first pressure chamber 6. The pressure connection 5 leads into the second pressure chamber 7. Of course, this can also be achieved vice versa.

Figure 4:
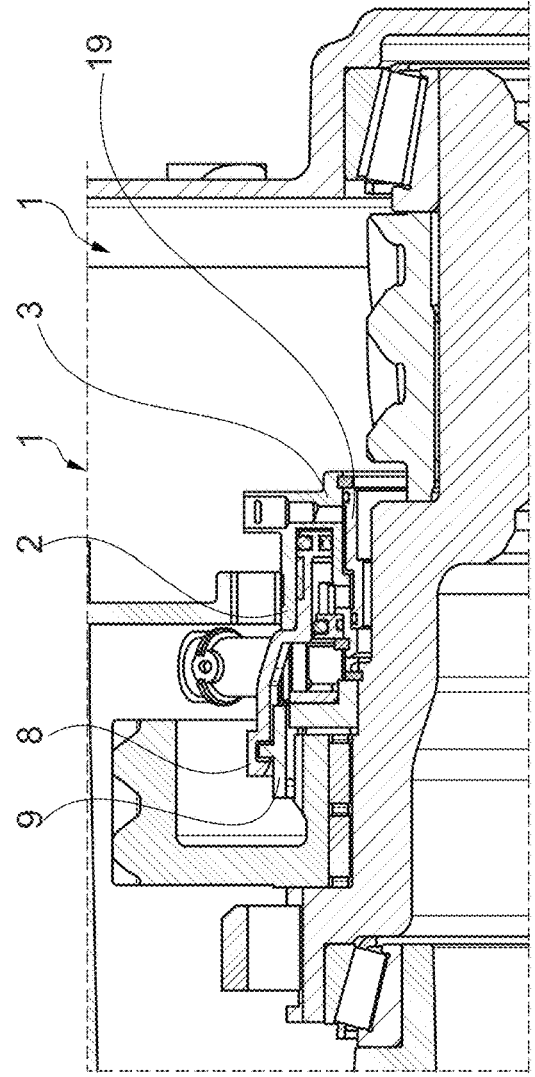
FIG. 4 shows a clutch according to the disclosure, wherein the pressure chambers are located radially inside the piston.
Figure 5:
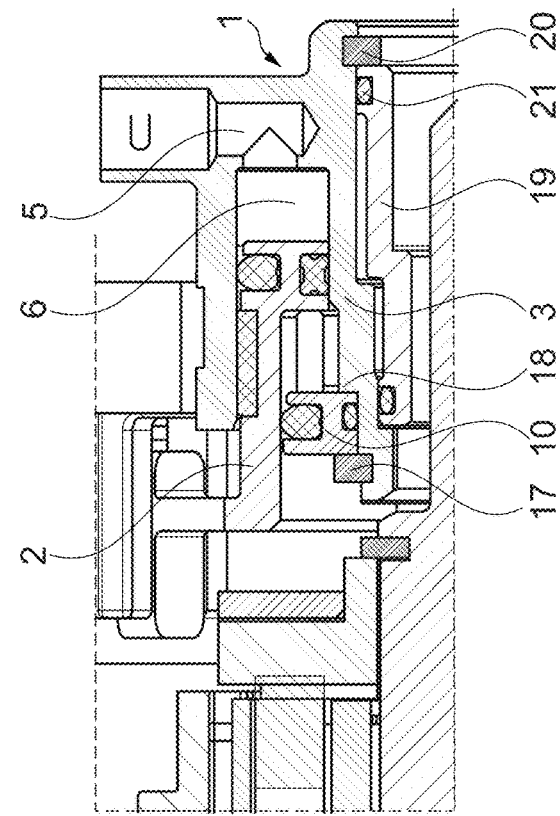
FIGS. 5 and 6 show the "claw closed" (FIG. 5) and "claw opened" (FIG. 6) operating positions of the clutch of FIG. 4.
Figure 6:
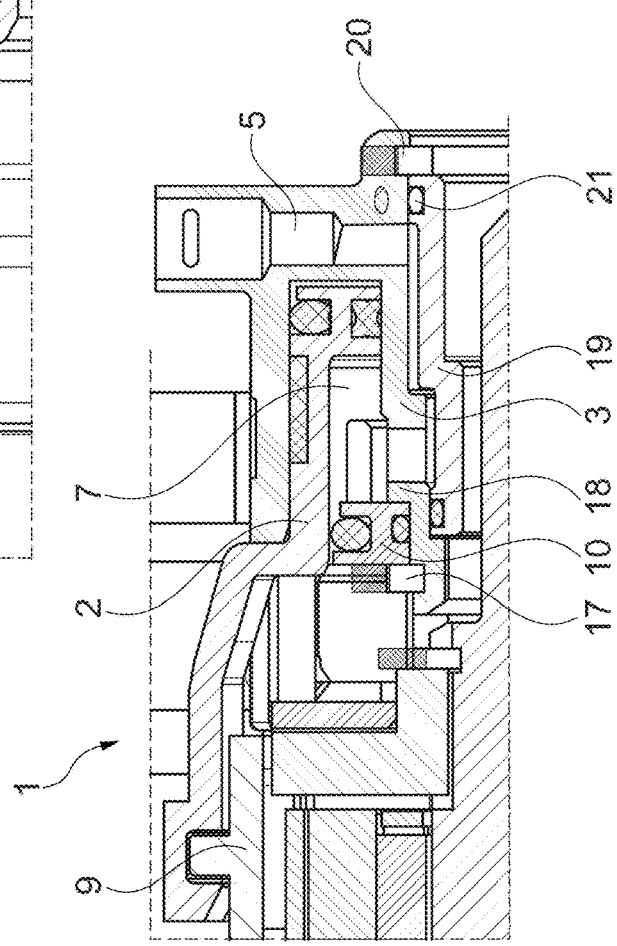

An actuating cap 8 is also attached to the piston 2. In the case of the clutch 1 of FIGS. 1 to 3, the piston 2 and the actuating cap 8 are two separate components that are attached to each other. In the case of the clutch 1 of FIGS. 4 to 6, the piston 2 and the actuating cap 8 form an integral, single-material component made in one piece.

The actuating cap 8 engages a sliding sleeve 9. For the clutches 1 of FIGS. 1 to 6 there is also a stop disc/baffle plate 10. The stop disc 10 has a first seat 11 on the radial outside and a second seat 12 on the radial inside.

As can be seen in FIGS. 2 and 3, there is a seal 13 in each of the two seats 11 and 12. These seals 13 seal the pressure chamber 7, i.e., the second pressure chamber. Two further seals 14 seal the first pressure chamber 6. The stop disc 10 has an axial projection 15. In its "claw open" operating position, the axial projection 15 extends completely through the second pressure chamber 7 and rests against the piston 2, as shown in FIG. 3. The axial projection 15 protrudes from an end face 16 of the stop washer 10.

There is a circlip 17 and a step 18 by means of which the stop disc 10 is directly or indirectly fixed about its axial position. This is shown particularly well in FIGS. 5 and 6.

Returning to FIG. 4, attention should be drawn to a pressure space sleeve 19. This pressure space sleeve 19 connects the pressure connection 5 to the second pressure chamber 7.

The pressure space sleeve 19 is fixed in its position by means of a pressure space sleeve circlip 20 with the interposition of a seal in the manner of an O-ring 21.

Figure 7:
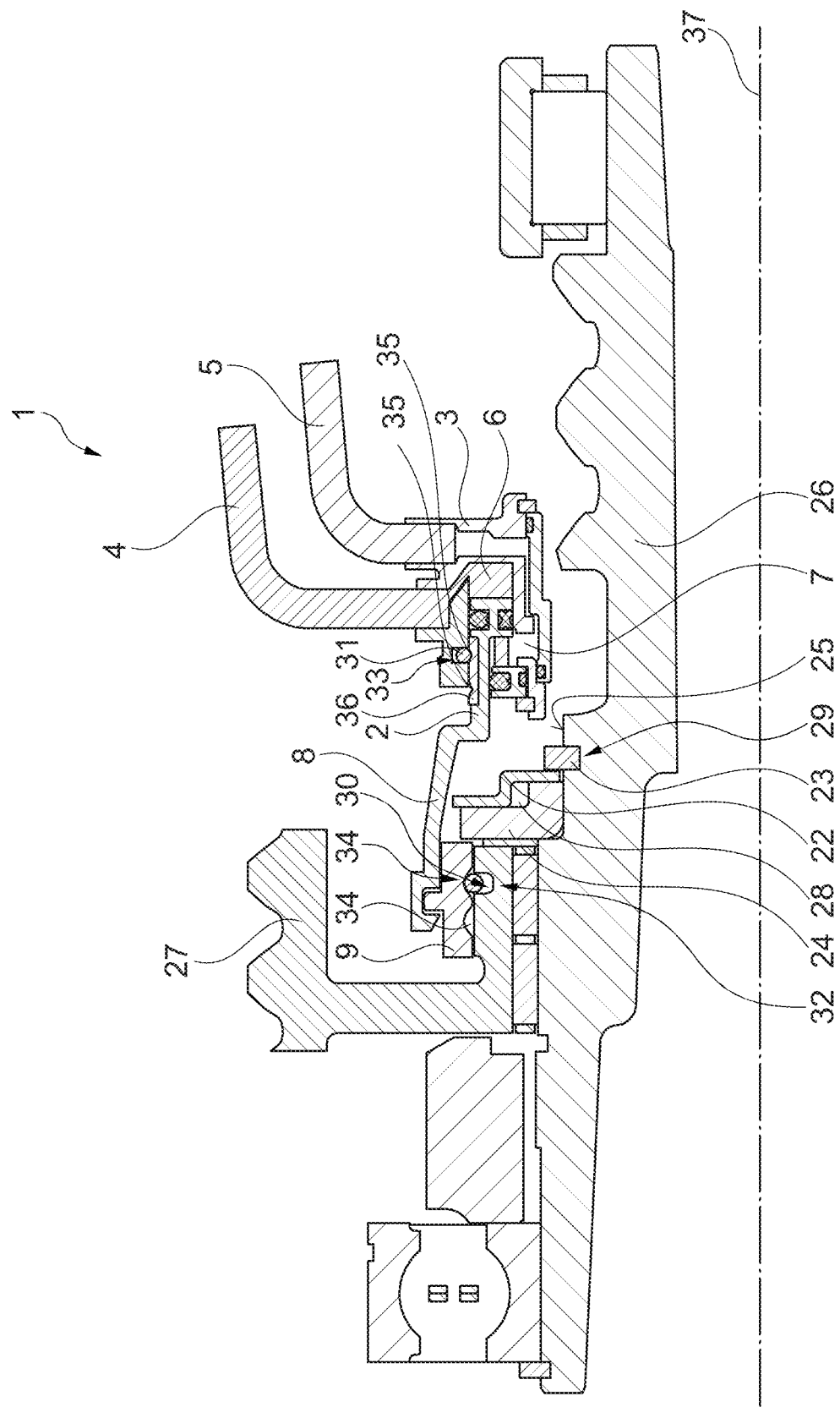
FIG. 7 shows a detail of a longitudinal section through a further clutch according to the disclosure in a first operating position, wherein an intermediate shaft with an end stop disc mounted thereon is used as a special feature.

FIG. 7 shows a clutch 1 with an end stop disc 22. This end stop disc 22 is arranged axially between a securing ring 23 and clutch body 24. These two components are located on a lateral surface 25 of an (intermediate) shaft 26. There is also an idler gear 27.

The end stop disc 22 has an S-shape and is elastic in the axial direction. It is made of sheet metal. An empty space 28 is enclosed between the end stop disc 22 and the clutch body 24. The securing ring 23 sits in a groove 29 in the lateral surface 25.

There are a variety of locking elements, namely the locking element 30 and the locking element 31. Both the locking element 30 and the locking element 31 are designed as balls. The locking element 30 sits in a locking element receiving groove/groove 32, whereas the locking element 31 sits in a locking element receiving groove/groove 33 in the housing 3. The locking element 30 is intended for locked/locking insertion into channels/grooves 34, whereas the locking element 31 is intended to engage in similar channels/grooves 35 in an insert 36 which is anchored in the piston 2. These channels/grooves 34 and 35 have a beveled surface. The axis of rotation is provided with the reference sign 37.

There is also a pair of bearings on the (intermediate) shaft 26.

Figure 8:
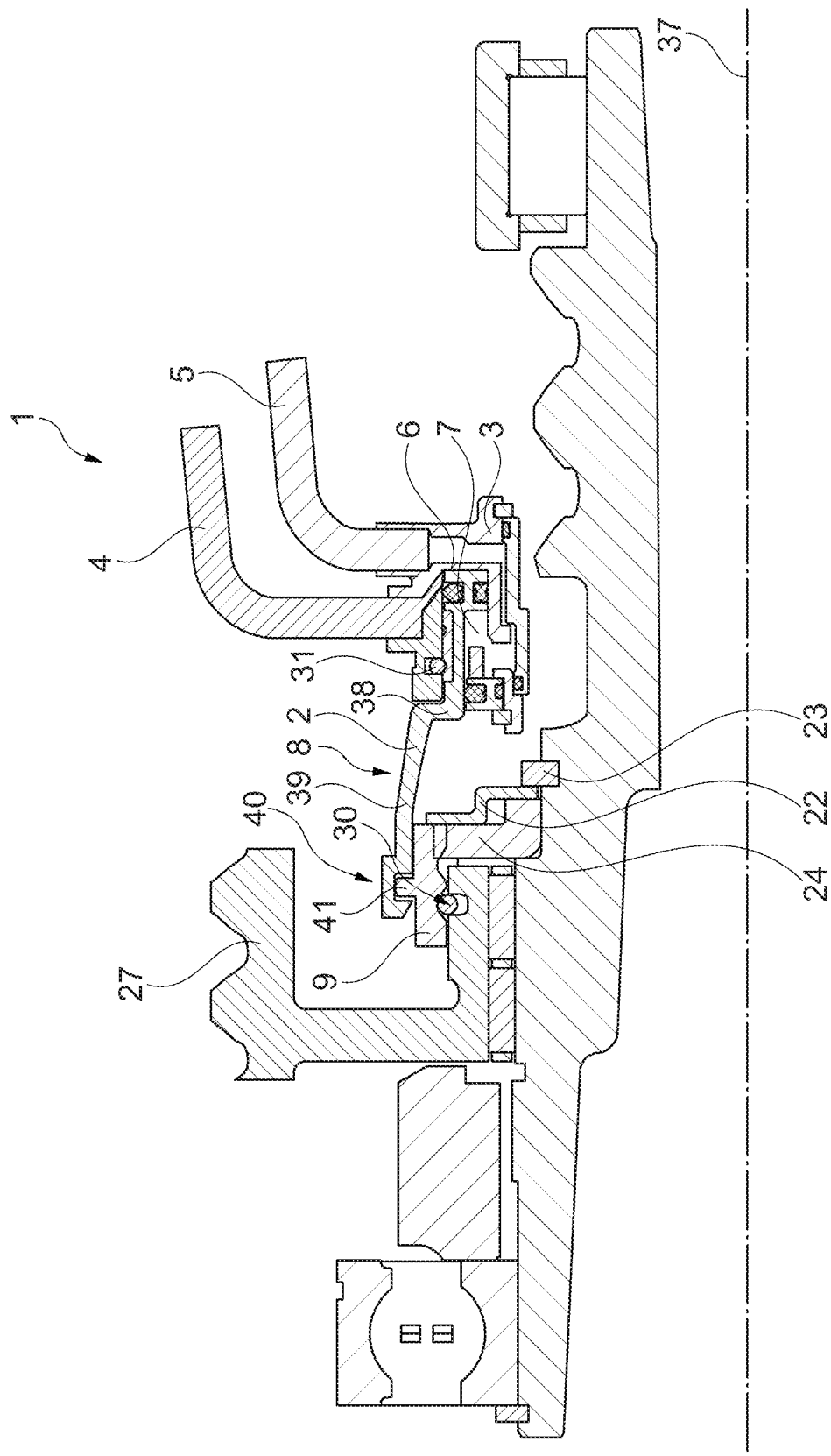
FIG. 8 shows a detail of a longitudinal section through the further clutch according to the disclosure in a second operating position, in which the shift sleeve and the actuating cap are in an axially displaced position relative to FIG. 7, and FIGS. 9 and 10 show the switching position details of the actuating cap, wherein in FIG. 9 a snap closure is shown enlarged in longitudinal section, and in FIG. 10 a cantilever-like arm is shown enlarged in perspective.

While one position of the clutch is assumed in FIG. 7, the other shifting position of the clutch 1 is assumed in FIG. 8.

Figure 9:
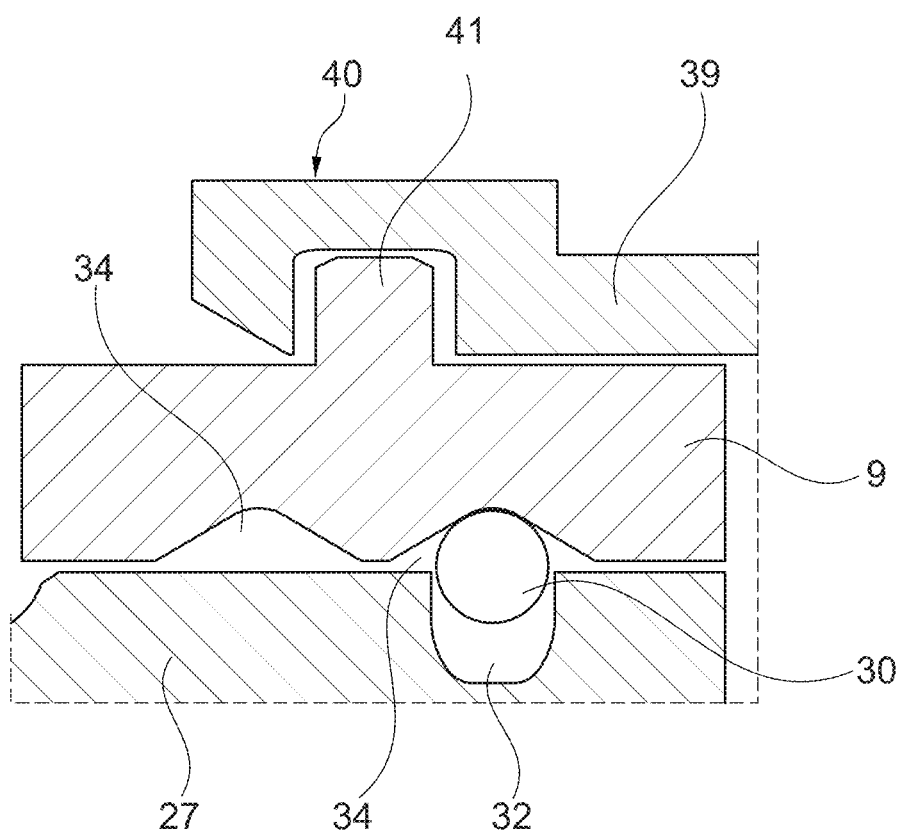

Attention should also be paid again to the design of the actuating cap 8 with a main body 38 which merges into a cantilever-like arm 39 which forms a snap closure 40 at its free end which surrounds a radial projection 41 of the shift sleeve/sliding sleeve with axial clearance. See also FIG. 9.

Figure 10:
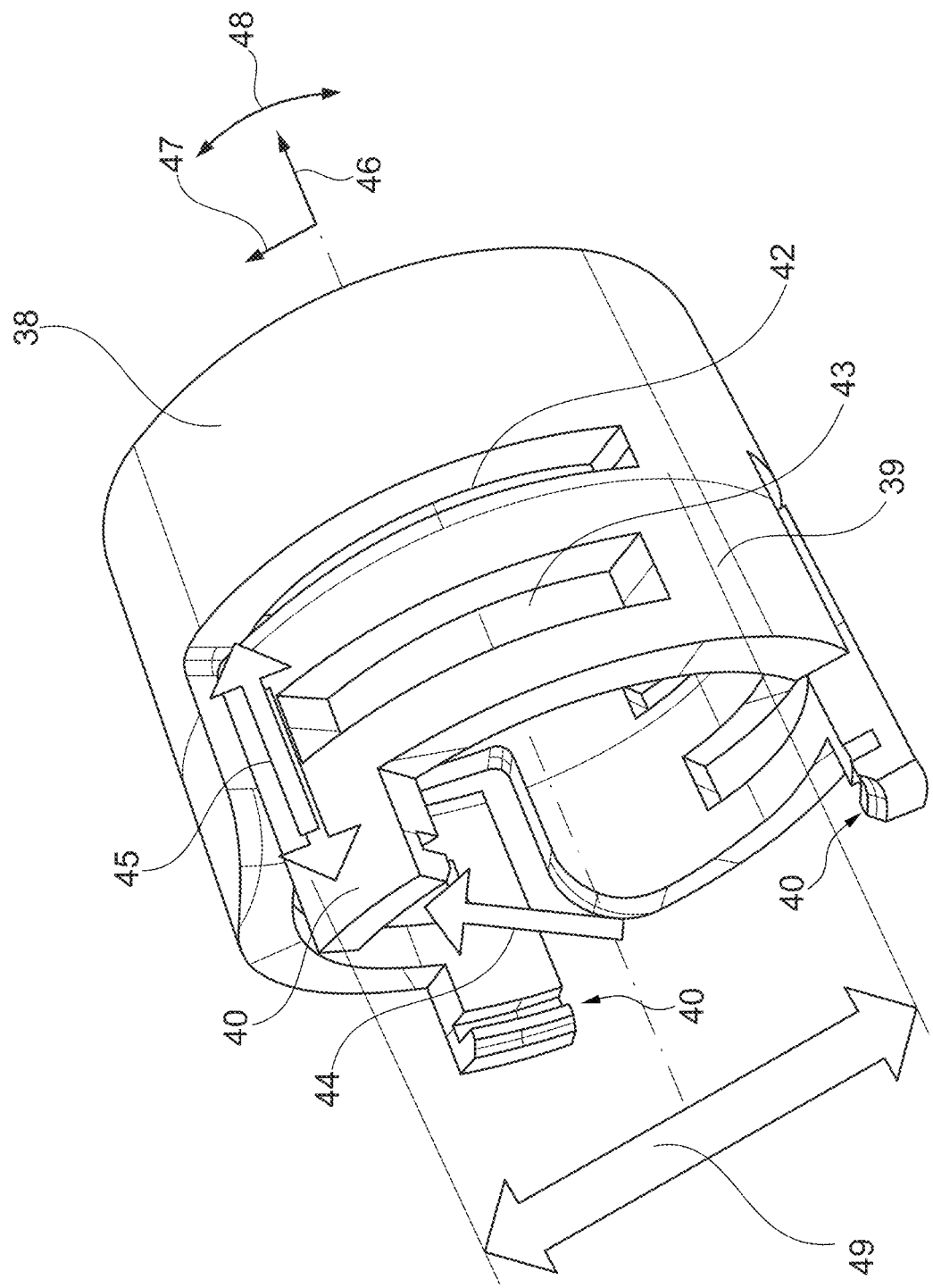

As also indicated in FIG. 10, the snap closure-like end of the cantilever-like arm 39 is designed in the manner of a clip or gripper. There is a slit 42 on the one hand and a slot 43 on the other hand in order to selectively adjust the elasticities/stiffnesses shown with the arrows 44 and 45.

As in FIG. 1, the axial direction is designated with the reference sign 46 and the radial direction is designated with the reference sign 47 in FIG. 10. In FIG. 10, the circumferential direction is indicated by the reference sign 48.

The cantilever-like arm 39 thus represents a lever 49.

REFERENCE NUMERALS

1 Clutch
2 Piston/shifting piston
3 Housing/(shifting) cylinder
4 Pressure connection
5 Pressure connection
6 First pressure chamber
7 Second pressure chamber
8 Actuating cap
9 Sliding sleeve/shift sleeve
10 Stop disc/baffle plate
11 First seat
12 Second seat
13 Seal
14 Seal
15 Axial projection
16 End face
17 Circlip
18 Step
19 Pressure space sleeve
20 Pressure space sleeve circlip
21 O-ring
22 End stop disc
23 Securing ring
24 Clutch body
25 Lateral surface
26 (Intermediate) shaft
27 Idler gear
28 Empty space
29 Groove
30 Locking element
31 Locking element
32 Locking element receiving groove/groove
33 Locking element receiving groove/groove
34 Channel/groove
35 Channel/groove
36 Insert
37 Axis of rotation
38 Main body
39 Cantilever-like arm
40 Snap closure
41 Radial projection
42 Slit/recess
43 Slot
44 Elasticity/Stiffness
45 Elasticity/Stiffness
46 Axial direction
47 Radial direction
48 Circumferential direction
49 Lever

The invention claimed is:

1. A clutch for coupling and decoupling a motor from a motor vehicle drive train, comprising a piston which is arranged in a pressure-dependent axially movable manner between two pressure chambers in a housing, wherein the piston is connected to an actuating cap which is prepared for contacting/moving a sliding sleeve, wherein the actuating cap has a section which is designed as a cantilever-like arm and has a snap closure at its free end for engaging on the sliding sleeve, and wherein the cantilever-like arm projecting from a main body of the actuating cap is spaced apart by a slit extending between the cantilever-like arm and the main body, by means of which the elasticity/stiffness in the axial direction and radial direction is selectively adjusted.

2. The clutch according to claim 1, wherein the slit extends only partially through the material of the actuating cap in the circumferential direction, but completely through the material of the actuating cap in the radial direction.

3. The clutch according to claim 1, wherein a slot is provided in the cantilever-like arm.

4. The clutch according to claim 3, wherein the slot runs parallel to the slit.

5. The clutch according to claim 1, wherein the cantilever-like arm defines a lever.

6. The clutch according to claim 1, wherein the snap closure surrounds a radial projection of the sliding sleeve with axial clearance.

7. The clutch according to claim 4, wherein the slot is designed as a rectangular through-opening.

8. The clutch according to claim 1, wherein the sliding sleeve is connected to the actuating cap.

9. A clutch for selectively coupling a motor to a motor vehicle drivetrain, comprising:
a sliding sleeve;
an actuating cap arranged for moving the sliding sleeve, the actuating cap comprising a cantilever-like arm with a snap closure at a free end, the snap closure being arranged to engage on the sliding sleeve;

a housing comprising two pressure chambers; and a piston arranged in a pressure-dependent axially movable manner between the two pressure chambers, wherein:

the actuating cap comprises a main body and a slit extending between the cantilever-like arm and the main body;

the cantilever-like arm projects from the main body; and the slit is arranged to adjust a stiffness of the cantilever-like arm in an axial direction and a radial direction.

10. The clutch of claim 9, wherein the slit extends:

only partially through the actuating cap in a circumferential direction; and fully through the actuating cap in the radial direction.

11. The clutch of claim 9, wherein the cantilever-like arm comprises a slot.

12. The clutch of claim 11, wherein the slot runs parallel to the slit.

13. The clutch of claim 12, wherein the slot is a rectangular through-opening.

14. The clutch of claim 9, wherein the cantilever-like arm is a lever.

15. The clutch of claim 9, wherein:

the sliding sleeve comprises a radial projection; and the snap closure surrounds the radial projection with an axial clearance therebetween.

16. The clutch of claim 9, wherein the sliding sleeve is connected to the actuating cap.

* * * * *